United States Patent
Baba et al.

(10) Patent No.: US 7,630,411 B2
(45) Date of Patent: Dec. 8, 2009

(54) MULTIPLEXING APPARATUS AND DEMULTIPLEXING APPARATUS

(75) Inventors: Masayuki Baba, Tokyo (JP); Yoshiaki Kato, Tokyo (JP); Yukinari Matsuda, Tokyo (JP)

(73) Assignee: Mitsubishi Denki Kabushiki Kaisha, Toyko (JP)

( * ) Notice: Subject to any disclaimer, the term of this patent is extended or adjusted under 35 U.S.C. 154(b) by 841 days.

(21) Appl. No.: 10/467,342

(22) PCT Filed: Jul. 31, 2001

(86) PCT No.: PCT/JP01/06598

§ 371 (c)(1), (2), (4) Date: Aug. 20, 2003

(87) PCT Pub. No.: WO02/067530

PCT Pub. Date: Aug. 29, 2002

(65) Prior Publication Data

US 2004/0071143 A1 Apr. 15, 2004

(30) Foreign Application Priority Data

Feb. 20, 2001 (JP) .............................. 2001-043375
Jun. 28, 2001 (JP) .............................. 2001-196270

(51) Int. Cl.
*H04J 3/04* (2006.01)
(52) U.S. Cl. ...................................... 370/535; 370/474
(58) Field of Classification Search ......... 370/470–474, 370/535–545
See application file for complete search history.

(56) References Cited

U.S. PATENT DOCUMENTS 5,732,085 A * 3/1998 Kim et al. .................... 370/398

(Continued)

FOREIGN PATENT DOCUMENTS

EP 0 805 601 A2 11/1997

(Continued)

OTHER PUBLICATIONS

"Multiplexing protocol for low bit rate multimedia communication" JT-H223, TTC Standard, The Telecommunication Technology Committee, pp. 8-9 and 29-31 Aug. 1999 (corresponding to ITU-T Recommendation H.223, Mar. 1996).

(Continued)

*Primary Examiner*—Ricky Ngo
*Assistant Examiner*—Gary Mui
(74) *Attorney, Agent, or Firm*—Oblon, Spivak, McClelland, Maier & Neustadt, L.L.P.

(57) ABSTRACT

First and second input data sequences are packetized to produce packets having fixed first and second lengths, respectively. A flag and headers are attached to the packets for transmission. In a demultiplexing apparatus, when the header cannot be properly identified, subsequent demultiplexing steps are performed by estimating that the subsequent data is the first input data sequence, when the first length occurs before the next flag, and estimating that the subsequent data is the second input data sequence, when the second length occurs. When the flag cannot be properly identified, the flag is expected at the first length from the previous header when the previous header indicates the first input data sequence, and the flag is expected at the second length when the previous header indicates the second input data sequence.

8 Claims, 3 Drawing Sheets

U.S. PATENT DOCUMENTS

| | | | | |
|---|---|---|---|---|
| 5,936,965 A * | 8/1999 | Doshi et al. | | 370/469 |
| 6,021,135 A * | 2/2000 | Ishihara et al. | | 370/474 |
| 6,233,251 B1 * | 5/2001 | Kurobe et al. | | 370/471 |
| 6,317,437 B1 * | 11/2001 | Park et al. | | 370/465 |
| 6,414,967 B2 * | 7/2002 | Van Grinsven et al. | | 370/466 |
| 6,463,082 B2 * | 10/2002 | Bergenwall et al. | | 370/535 |
| 6,480,509 B1 * | 11/2002 | Grutter | | 370/477 |
| 6,490,243 B1 * | 12/2002 | Tanaka et al. | | 370/216 |
| 6,574,294 B1 * | 6/2003 | Lynch et al. | | 375/354 |
| 6,661,793 B1 * | 12/2003 | Pogrebinsky | | 370/394 |
| 6,788,682 B1 * | 9/2004 | Kimmitt | | 370/389 |
| 6,922,401 B1 * | 7/2005 | Dirschedl et al. | | 370/278 |
| 6,947,563 B2 * | 9/2005 | Fagin et al. | | 380/278 |
| 6,950,443 B1 * | 9/2005 | Kaneko | | 370/474 |
| 6,959,020 B1 * | 10/2005 | Hourunranta et al. | | 370/542 |
| 7,088,680 B1 * | 8/2006 | Freitag et al. | | 370/236 |
| 7,173,946 B2 * | 2/2007 | Park et al. | | 370/535 |
| 2004/0213248 A1 * | 10/2004 | Okuda et al. | | 370/395.1 |

FOREIGN PATENT DOCUMENTS

| | | | |
|---|---|---|---|
| EP | 0 873 631 | | 10/1998 |
| JP | 63-92140 | | 4/1988 |
| JP | 8-102760 | | 4/1996 |
| JP | 11-98149 | | 4/1999 |
| JP | 11-225127 | | 8/1999 |
| JP | 11-234306 | | 8/1999 |
| JP | 2000-32416 | | 1/2000 |
| JP | 2000-502547 | | 2/2000 |
| JP | 2001-195327 | | 7/2001 |
| WO | WO 98/18246 | | 4/1998 |
| WO | WO 00/35162 | * | 6/2000 |

OTHER PUBLICATIONS

Jim Wilkinson, "The SMPTE Data Coding Protocol and Dictionaries", SMPTE Journal, XP-000950346, vol. 109, No. 7, Jul. 2000, pp. 579-586.

* cited by examiner

MULTIPLEXING APPARATUS AND DEMULTIPLEXING APPARATUS

TECHNICAL FIELD

The present invention relates to a multiplexing apparatus receiving multimedia data of a plurality of types including digitized video, audio and general-purpose data, packetizing the input data, multiplexing resultant packets, and transmitting a resultant multiplexed stream, and also relates to a demultiplexing apparatus for demultiplexing the multiplexed stream.

BACKGROUND ART

FIG. 1 shows a construction of a multiplexed stream 10 shown, for example, in the ITU-T Recommendation H.223. Referring to FIG. 1, the stream comprises input data sequences 14 (A and B), a flag 11 that marks a separation between packets, a header 12 for packet type identification, error control and indication of the continuity of packets, and data 13 produced by splitting (packetizing) the input data sequence 14 into an appropriate length.

A description will now be given of the operation according to the related art.

FIG. 1 shows an example of transmitting a multiplexed stream 10 produced as a result of multiplexing the two input data sequences 14. In this case, the multiplexing apparatus splits the two input data sequences 14 (A and B) to have an appropriate length to produce the packet 13. The flag 11 and the header 12 indicating the data type of the packet are attached to the data 13 for transmission.

The demultiplexing apparatus receiving the multiplexed stream 10 detects the flag 11 and analyzes the header 12 that follows the flag 11 in order to identify the type of data 13. The demultiplexing apparatus assumes that the data 13 are being received until the next flag 11 is detected. The data 13 of the same data type are collected to restore the original input data sequences 14 (A and B).

A problem with the related-art demultiplexing apparatus is that, when an emulation of the flag 11 occurs as a result of a pattern identical with the flag 11 being mixed in the data 13, the pattern is misidentified as the flag 11. When this occurs, it is impossible to restore the input data 14 normally until the next flag 11 is detected properly.

Failure to identify the flag 11 also occurs when a transmission error is introduced in the multiplexed stream 10. As a result of the failure, it is impossible to restore the input data sequence 14 normally until the next flag 11 is detected properly.

Even when the flag 11 is detected, the input data sequence 14 may not be restored normally if the header 12 is misidentified due to a transmission error or the like.

The present invention has been developed with a view to resolving the above problems and has objectives of providing a multiplexing apparatus producing a multiplexed stream that is demultiplexed properly even when a flag emulation occurs or when an error in transmitting a flag or a header occurs, and providing a demultiplexing apparatus capable of demultiplexing the multiplexed stream properly.

DISCLOSURE OF THE INVENTION

The problems described above are resolved by a first aspect of the present invention which provides a multiplexing apparatus for packetizing input data of a plurality of data types, and multiplexing resultant packets for transmission, wherein identification information indicating the data type is attached to each of the packets, and a packet length differs from data type to data type.

According to a second aspect of the invention, when a variable-length packet that does not match a fixed length is produced as a result of fixed-length packetization for packetizing the input data into packets of the fixed length that depends on the data type, the identification information is attached to the variable-length packet to indicate that the packet length is shorter than the fixed length.

According to a third aspect of the invention, packetization for packetizing the input data into packets of the packet length that depends on the data type results in a plurality of variable-length packets instead of fixed-length packets, the identification information is attached to the variable-length packets to indicate that a maximum length is defined for the variable-length packets.

According to a fourth aspect of the invention, the identification information identifies the packet as a variable-length packet and indicates a range in which the length of the variable-length packet resides.

According to a fifth aspect of the invention, the identification information identifies the packet as a variable-length packet and indicates a range in which the length of the variable-length packet resides.

According to a sixth aspect of the invention, the number of flags indicating a separation between packets and provided after the variable-length packet multiplexed is larger than the number of flags provided after the fixed-length packet.

According to a seventh aspect of the invention, the number of combinations of bits set in the identification information is minimized and a Hamming distance between the combinations is maximized.

According to an eighth aspect of the invention, length information is attached to each of the packets multiplexed.

A ninth aspect of the present invention provides a demultiplexing apparatus for receiving multiplexed data in which identification information indicating a data type is attached to each of packets, and in which are multiplexed input data packets of a plurality of data types and of a length that depends on the data type, restoring the individual packets based on a flag indicating a separation between the packets, and outputting the packets for each of the data types based on the identification information.

According to a tenth aspect of the invention, the identification information attached to a variable-length packet indicates a range in which the length resides, an expected position of the flag is identified based on the identification information attached to the variable-length for subsequent packet restoration based on the detected flag, and the restored packets for each of the data types are output.

According to an eleventh aspect of the invention, when the packet having length information attached is received, an expected position of the flag is identified based on the length information for subsequent packet restoration which is based on the detected flag, and the restored packets for each of the data types are output.

According to a twelfth aspect of the invention, when the flag cannot be identified, an expected position of the flag is identified by identifying the length of the packet that precedes the missed flag, based on one of the identification information attached to the preceding packet indicating the fixed length and the length information attached to the preceding packet.

According to a thirteenth aspect of the invention, when the flag cannot be identified, an expected position of the flag is identified by identifying the length of the packet that precedes the missed flag, based on the identification information attached to the preceding packet and indicating the variable length.

According to a fourteenth aspect of the invention, when the identification information cannot be identified successfully, the data type is estimated based on the packet length.

According to a fifteenth aspect of the invention, when an error is introduced in the identification information, a value closest to the information in error in Hamming distance is identified as the identification information.

According to a sixteenth aspect of the invention, when the length of a packet or a range thereof is identified based on one of the identification information and the length information, a search for the flag is not performed until the neighborhood of the identified length or the range is reached.

According to a seventeenth aspect of the invention, the flag is detected in the received multiplexed data and the subsequent identification information is analyzed to determine whether a fixed-length packet or a variable-length packet follows, when it is determined that the fixed-length packet follows and when the flag is identified at an position expected based on the fixed length, the data already received are restored based on the identification information, and when it is determined that the variable-length packet follows and the flag is identified in the range expected from the variable length, the data already received are restored based on the identification information.

According to an eighteenth aspect of the invention, when the flag is detected, a determination is made as to whether the identification information follows the detected flag, when it is determined that the identification information follows, the detected flag is identified as a normal flag, and when it is determined that the identification information does not follow, the detected flag is not identified as a normal flag.

According to a nineteenth aspect of the invention, when a pattern not identical with the flag is detected at a position where the flag is expected, that pattern is identified as a flag for subsequent demultiplexing steps, on the condition that the subsequent data is identified as the identification information and it is determined that the pattern at the expected position is produced by an error in the flag value.

According to a twentieth aspect of the invention, when the identification information cannot be identified and the data type cannot be estimated from the packet length, the data is restored as data with the identification information that occurs relatively frequently.

BEST MODE FOR CARRYING OUT THE INVENTION

The best mode for carrying out the invention will now be described with reference to the attached drawings in order to give a detailed explanation of the invention.

FIRST EMBODIMENT

Figure 1:
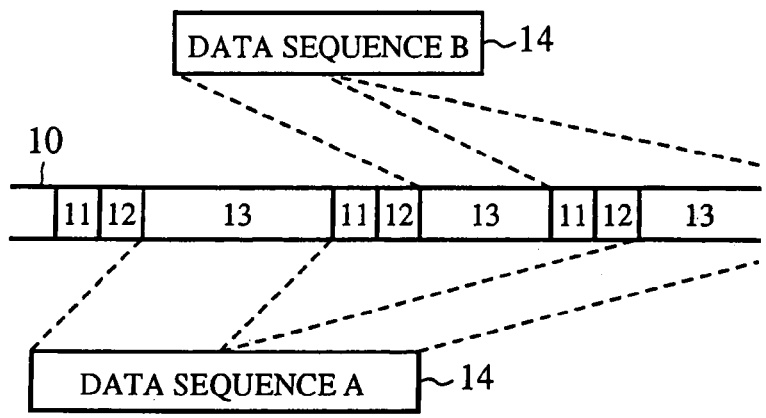
FIG. 1 shows a construction of a multiplexed stream 10 shown in the ITU-T Recommendation H. 233.
Figure 2:
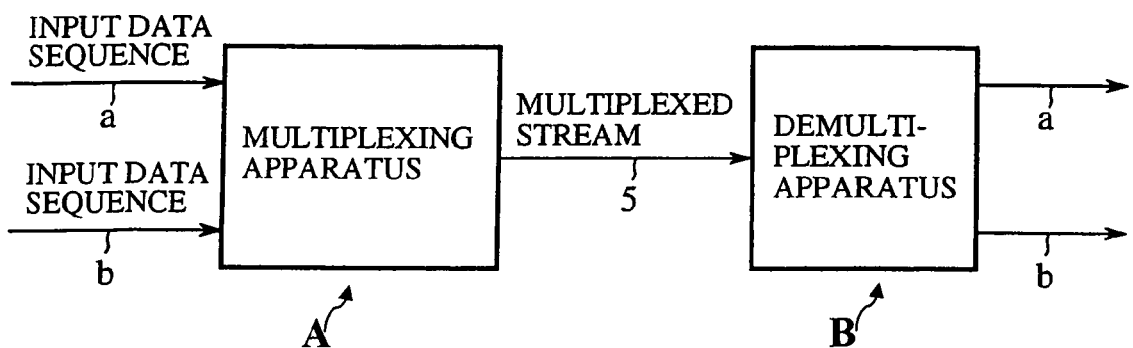
FIG. 2 shows a connection between a multiplexing apparatus and a demultiplexing apparatus according to the invention.

FIG. 2 shows a connection between a multiplexing apparatus and a demultiplexing apparatus according to the invention. Referring to FIG. 2, a multiplexing apparatus A and a demultiplexing apparatus B are connected to each other via a network such as the Internet (not shown) The multiplexing apparatus A transmits to the demultiplexing apparatus B a multiplexed stream 5 produced as a result of multiplexing the input data sequences a and b. The demultiplexing apparatus B receives the multiplexed stream from the multiplexing apparatus A, and restores and outputs the input data sequence a and b. The construction of the multiplexing apparatus A and the demultiplexing apparatus B is not particularly new so that the description thereof is omitted.

Figure 3:
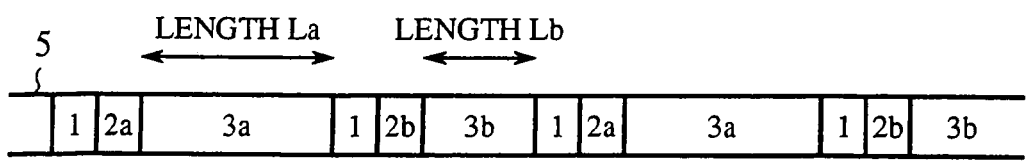
FIG. 3 shows a multiplexed stream 5 transmitted by a multiplexing apparatus A according to a first embodiment and received by a demultiplexing apparatus B according to the first embodiment.

FIG. 3 shows a multiplexed stream 5 transmitted by the multiplexing apparatus A according to the first embodiment and received by the demultiplexing apparatus B according to the first embodiment.

Referring to FIG. 3, the multiplexed stream 5 comprises a flag 1 that marks a separation between packets, headers 2a and 2b provided as identification information indicating a data type a or b of the input data sequence being multiplexed, and packets 3a and 3b produced by packetizing the input data sequence a and b to have an appropriate length, respectively. In describing the embodiments of the present invention, it is assumed that two types of data a and b are multiplexed. However, any number of types of data may be multiplexed. The input data may be categorized into video, audio, message data and the like using the type of media as a criteria. Data of the same media type, e.g. video, may be further categorized according to the type of information source such as an encoder, according to the type of coding scheme used, or according to the type of program, a category above the media type in the hierarchy of categories, in which the video data are used.

A description will now be given of the operation according to the first embodiment.

As shown in FIG. 3, the multiplexing apparatus A receiving the input data of the types a and b packetizes the data to have respective fixed length La and Lb, thus producing the packets 3a and 3b. The flag 1 marking a separation between the packets and the headers 2a and 2b provided as identification information indicating the data types a and b, are attached to the packets 3a and 3b before transmission. The resultant multiplexed stream 5 is shown in FIG. 3.

The demultiplexing apparatus B receiving the multiplexed stream 5 detects the flag 1 and then analyzes the header 2 that follows the flag 1 in order to identify the data type of the packet that follows the header 2. The demultiplexing apparatus B restores the packet properly by assuming that the same packet is being received until the next flag 1 is detected.

When the header 2 cannot be identified properly due to a transmission error or the like, the demultiplexing apparatus B cannot identify the data type of the subsequent packet. If the data of a length La occurs before the next flag 1, it is assumed that the input data sequence a is received. If the data length Lb is identified before the next flag 1, it is assumed that the input data sequence b is received.

The demultiplexing apparatus B according to the first embodiment may negotiate, before the transmission, with the multiplexing apparatus A for the type of input data multiplexed by the multiplexing apparatus A, the fixed length into which the input data of each data type is split, the number of bits constructing the flag 1 and the header 2, etc. so that the length of the packets 3a and 3b is identified by identifying the headers 2a and 2b in the multiplexed stream 5. Alternatively, the multiplexing apparatus A may transmit related information through a negotiation that occurs before the reception of the multiplexed stream 5 so that the demultiplexing apparatus B is notified accordingly. The same approach as described above is also employed in the demultiplexing apparatus B of the other embodiments described in the following section.

Thus, according to the first embodiment, the multiplexing apparatus A packetizes the input data into packets of a fixed length that depends on the data type. The resultant packets are multiplexed for transmission. Accordingly, even if the demultiplexing apparatus B fails to analyze the header 2 properly, it is possible to identify the data type of the packet by referring to the data length of the packet between the flags for successful restoration of the data.

The demultiplexing apparatus B may fail to identify the flag 1 due to a transmission error or the like. Failure to identify the flag 1 properly may occur, for example, when the flag is corrupted due to a transmission error, or when a code identical with the flag is contained in the transmitted data, i.e. when a so-called flag emulation occurs. In order to identify the flag 1 properly in this situation, the header 2 and the length should also be used in addition to the flag 1 itself.

The demultiplexing apparatus B according to the first embodiment is configured such that, when the flag 1 cannot be identified properly due to a transmission error or the like, subsequent demultiplexing steps may proceed by assuming that the missed flag 1 occurs at a distance of length La from the preceding header 2, if the preceding header 2, the identification information, indicates the data sequence a. Similarly, if the header 2 indicates the input data sequence b, it is assumed for the purpose of the subsequent demultiplexing steps, that the missed flag 1 occurs at a distance of length Lb from the header 2.

Thus, according to the first embodiment, the multiplexing apparatus A packetizes the input data into packets of a fixed length that depends on the data type. The packets are multiplexed for transmission. Accordingly, even if the demultiplexing apparatus B fails to detect the flag 1 properly, the type of packet is identified and the packet length is also identified, by referring to the preceding header 2. Therefore, it is possible to know the position at which the subsequent flag 1 occurs for successful data restoration.

In describing the first embodiment, it is assumed that the input data are split into packets of a fixed length that depends on the data type. Alternatively, when a packet shorter than the fixed length is generated as a result of successively packetizing the input data into fixed-length packets, the packet may remain as a variable-length packet for demultiplexing, as will be described in the second embodiment. Alternatively, that packet may also be turned into a packet of a fixed length determined by the input data type, by attaching a null packet to a packet shorter than the fixed length so that the resultant length is the same as that of the other fixed-length packets.

SECOND EMBODIMENT

In describing the first embodiment, it is assumed that the input data are split into packets of a fixed length determined by the data type for multiplexing and demultiplexing. A description will now be given of the second embodiment where the input data of the same type are split into variable-length packets for multiplexing and transmission.

Figure 4:
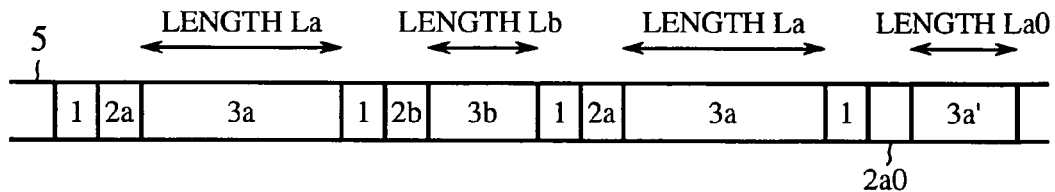
FIG. 4 shows a multiplexed stream transmitted by a multiplexing apparatus A according to a second embodiment and received by a demultiplexing apparatus B according to the second embodiment.

FIG. 4 shows a multiplexed stream transmitted by the multiplexing apparatus according to the second embodiment and received by the demultiplexing apparatus according to the second embodiment.

Referring to FIG. 4, the headers 2a, 2a0 and 2b are provided as identification information indicating the data type of the packets multiplexed and indirectly indicating, by designating a range, the length of the variable-length packet. The data that follows the header 2a is indicated to have a length La, the data that follows the header 2a0 is indicated to have a length La0 and the data that follows the header 2b is indicated to have a length Lb. The other aspects of the drawing are the same as the corresponding aspects of FIG. 3 so that the description thereof is omitted. The header 2a0 is a header for variable-length packets and the headers 2a and 2b are for fixed-length packets. By changing the fixed length depending on the data type, the headers 2a and 2b not only indicate the input data type but also identify the length of the fixed-length packet for the corresponding data type.

A description will now be given of the operation according to the second embodiment.

The multiplexing apparatus A packetizes the input data sequences a and b to have the fixed length La and Lb, respectively. The flag 1 and the headers 2a and 2b indicating the data type of the packet are attached to the resultant packets 3a and 3b for transmission.

A packet 3a' shorter than the fixed-length La may be generated as a result of successively splitting the input data sequence a into the packets 3a of the fixed length La. As shown in FIG. 4, the packet 3a' may have a length La0 shorter than the fixed length La of the normal packet 3a produced as a result of packetizing the input date a. In this case, the multiplexing apparatus A according to the second embodiment attaches the header 2a0 to the packet 3a' for multiplexing so as to indicate that the packet 3a' is of the same data type as the packet 3a and the length La0 thereof is different from the length La of the packet 3a.

In the multiplexing apparatus A according to the second embodiment, the header 2 attached to the packet as the identification information is used not only to indicate the data type but also identify the packet length. Accordingly, packets produced by splitting the input data of the same type may be multiplexed as variable-length packets.

The demultiplexing apparatus B according to the second embodiment receiving the multiplexed stream 5 detects the flag 1 in the received multiplexed stream 5, analyzes the header 2 that follows the flag 1 so as to identify the data type of the subsequent data and also to identify the packet length.

In a similar configuration as the first embodiment, the demultiplexing apparatus B according to the second embodiment analyzing the headers 2a and 2b identifies the length La and Lb for the data types a and b of the packet 3a and 3b, respectively. When analyzing the header 2a0, the demultiplexing apparatus B according to the second embodiment determines that the packet that follows the header $2a0$ is of the same data type as the packet $3a$ but has the length $La0$ different from the length La of the packet $3a$. It is thus possible for the demultiplexing apparatus B to expect that the packet $3a'$ will come to an end before reaching the length La and the flag 1 will be detected subsequently.

Accordingly, even when the detection of the flag 1 that follows the header $2a0$ fails, the demultiplexing apparatus B according to the second embodiment is capable of proceed further with demultiplexing steps by detecting, subsequent to the detection of the header $2a0$, a pattern similar to the flag 1 before reaching the length La, and interpreting the pattern as the flag 1.

The multiplexing apparatus A according to the second embodiment basically packetizes the input data of the same type into fixed-length packets. It is ensured that the maximum length of the variable-length packet, not matching the fixed length and occurring at the end of packetization, is shorter than the length of the fixed-length packet. Moreover, in addition to the header attached to the fixed-length packet, the header $2a0$, dedicated to variable-length packets and capable of identifying the data type and the length, is attached to the packet that does not match the fixed length. As a result, even when the detection of the flag 1 fails, the header $2a0$ immediately preceding the flag 1 enables successful restoration of the data, by designating a range in which the subsequent flag 1 should be detected and by allowing a pattern similar to the flag 1 to be processed as the flag.

There are cases in which the multiplexing apparatus A is not able to determine the length of the input data, or the data length is variable. For these reasons, the input data may be regularly split into variable-length packets for transmission instead of splitting them into the fixed-length packets. In these cases, the maximum length of the variable-length packets may be defined. In this way, even the detection of the flag 1 subsequent to the header 2 fails due to a transmission error or the like, the demultiplexing apparatus B according to the second embodiment may proceed further with demultiplexing steps by detecting a pattern similar to the flag within a distance of the defined maximum length from the header 2 and interpreting the pattern as the flag.

In other words, the maximum length Lmax may be defined for the variable-length packets resulting from the input data being packetized by the multiplexing apparatus A so that each of the resultant variable-length packets has a length shorter than Lmax and the same header 2 may be attached to each of the variable-length packets of a length shorter than Lmax. A minimum length may also be defined in addition to the maximum length so that the length of the variable-length packets resides in a range between the minimum length and the maximum length.

Thus, according to the multiplexing apparatus A of the second embodiment, the maximum length is defined for the variable-length packets resulting from the input data of the same type being packetized by the multiplexing apparatus A for multiplexed transmission, and the fixed header is consistently attached to the variable-length packets. With this, even when the flag cannot be properly detected, it is ensured that a range in which the subsequent flag is expected to occur is known by examining the header of the immediately preceding packet. By processing a pattern similar to the flag as the flag, data can be properly restored.

In an alternative configuration, the multiplexing apparatus A may split a variable-length packet (with the maximum length La) into a total of n variable-length packets having the length $La1, La2, \ldots$ and $Lan$, respectively, where $La1$ is equal to or greater than 0 and smaller than $La \times 1/n$, $La2$ is equal to or greater than $La \times 1/n$ and smaller than $La \times 2/n$, ... $Lan$ is equal to or greater than $La \times (n-1)/n$ and smaller than La. Headers $2a1, 2a2, \ldots 2an$ may be attached to the packets of the respective length. With this, the range, in which the length of the variable-length packet $3a$ with a length shorter than the length La resides, is known in a refined manner by examining the n headers $2a1, 2a2, \ldots$ and $2an$.

Accordingly, even when the demultiplexing apparatus B fails to detect the flag 1 subsequent to the header $2ax$, where x indicates any of 1 through N, it is possible to proceed further with demultiplexing steps by detecting a pattern similar to the flag 1 in a rage defined by the length between $La \times (x-1)/n$ and $La \times x/n$ and by interpreting the pattern as the flag 1.

By grading the length of the variable-length packet, the second embodiment enables the range of the length of the variable-length packet to be identified by examining the header 2. Accordingly, even when the flag 1 cannot be properly detected, it is possible to proceed further with demultiplexing steps by determining a range in which the flag is expected to occur by examining the header for each graded length of the variable-length packet, and by interpreting data similar to a flag as a flag.

By allowing both the data type a and the length $La0$ of the packet $3'$ to be identified by examining the header $2a0$ attached to the packet as identification information, it is possible to discriminate between packets of different data types and the same length. Referring to FIG. 4, even when the length Lb of the packet $3b$ and the length $La0$ of the packet $3a'$ are identical to each other, for example, it is possible to identify the data type of the packet $3a'$ since the header $2b$ and the header $2a0$ are different.

According to above-described aspect of the second embodiment, the header $2a0$ attached to the packet as identification information allows not only the data type but also the length $La0$ of the packet $3a'$ to be identified. Therefore, by configuring the length of the packet subsequent to the header to be different from header to header, it is possible to identify both the data type and the packet length by examining the header, even when packets of variable lengths are used for the same data type. Further, even when the header cannot be recognized due to a transmission error or the like, the data type can be identified by identifying the length of the packet. Referring to FIG. 4, the header $2a0$ of the packet $3a'$ may fail to be recognized so that the data type of the packet $3a'$ cannot be recognized, but the length $La0$ of the packet $3a'$ may be identified by detecting the flag 1. In this case, it is determined that the header for the packet $3a'$ is the header $2a0$, based on the length $La0$. Thus, the data type of the packet is recognized by knowing the length of the packet.

In the above description, it is assumed that the header for variable-length packets is used as identification information indicating a range of data length as well as the data type of the packet. Alternatively, the header may directly indicate the length as well as the data type. More specifically, assuming that the multiplexing apparatus A splits the packet of a maximum length La into variable lengths $La1, La2, \ldots, Lan$, the individual headers $2a1, 2a2, \ldots, 2an$ attached to the variable-length packets having the respective lengths may indicate the length of the variable-length packet directly such that the variable-length packet having the header $2a1$ has the length $1a1$, the variable-length packet having the header $2a2$ has the length $La2, \ldots$, and the variable-length packet having the header $2an$ has the length Lan.

With this, the demultiplexing apparatus B is capable of identifying the expected position of the subsequent flag by examining the header 2 directly indicating the length of the variable-length packet, in a manner more accurate manner than by examining the header 2 indicating a range of the length of the variable length packet.

As described above, according to the second embodiment, the demultiplexing apparatus B is capable of recognizing the length of the packet or the range thereof, as well as the data type, using data type information and length information included in the header 2. Accordingly, even when the flag 1 cannot be detected properly, the expected position of the subsequent flag is accurately identified by recognizing the length of the packet or the range thereof, using the previously-occurring packet header. By processing data similar to a flag as a flag, data can be properly restored.

In accordance with another aspect of the second embodiment, a search for a flag may be prevented until the neighborhood of the expected position of the subsequent flag 1 is reached, when the expected position of the subsequent flag 1 or the range thereof is identified by recognizing the length of the packet or the range thereof using the header 2.

With this, the range for a search is limited and the load imposed in detecting or searching for the flag 1 is reduced, by identifying the expected position of the flag 1 or the range thereof.

THIRD EMBODIMENT

In the first and second embodiments, one flag marking a separation is inserted between packets being multiplexed. A description will now be given of an embodiment in which the number of flags between packets being multiplexed is controlled.

Figure 5:
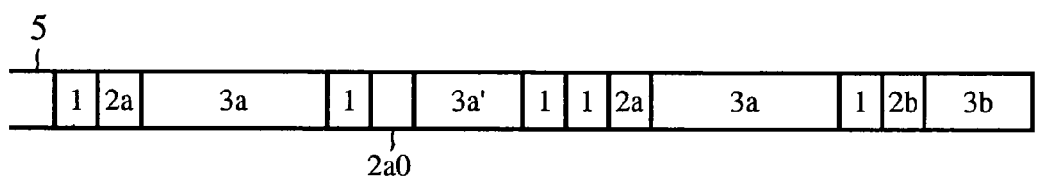
FIG. 5 shows a multiplexed stream transmitted by a multiplexing apparatus A according to a third embodiment and received a demultiplexing apparatus B according to the third embodiment.

FIG. 5 shows a multiplexed stream transmitted by the multiplexing apparatus A according to the third embodiment and received the demultiplexing apparatus B according to the third embodiment.

Referring to FIG. 5, the same reference numerals as used in FIG. 4 indicate like parts in FIG. 4 so that the associated detailed description thereof is omitted.

A description will now be given of the operation according to the third embodiment.

In a similar configuration as the second embodiment, the multiplexing apparatus A transmits the multiplexed stream 5 that includes the flags 1, the headers 2 and the packets 3. The demultiplexing apparatus B detects a separation between the packets 3 by detecting the flag 1 in the received multiplexed stream 5.

In transmitting variable-length packets, the multiplexing apparatus A according to the third embodiment attaches a larger number of flags immediately after the variable-length packet than after the fixed-length packet (in the case of FIG. 5, two flags 1 for the fixed-length packet are attached), before processing the next data for multiplexing. FIG. 5 shows that two flags 1 are attached after the variable-length packet 3a' since the variable-length packet 3a' occurs after the header 2a0. Subsequently, the next header 2a and the packet 3a are transmitted. Three or more flags instead of two flags may be attached immediately after the variable-length packet, the only requirement being that the number of flags inserted after the variable-length packet is larger than the number of flags inserted after the fixed-length packet. Principally, multiple flags present no problem to the demultiplexing apparatus B in restoring data.

When the demultiplexing apparatus B detects the header 2a that precedes the fixed-length data, the demultiplexing apparatus B is capable of identifying the expected position of the subsequent flag 1 accurately. However, when the header 2a0 that precedes the variable-length packet 3a' is detected, the demultiplexing apparatus B may not be able to identify the expected position of the flag 1. More specifically, the expected position of the subsequent flag 1 may not be identified accurately when the header 2 is allowed to indicate only a range of the length of the variable-length packet and the range is relatively extensive. When the detection of the flag 1 fails in this situation due to a transmission error or the like, the subsequent packets may not be properly restored.

The multiplexing apparatus A according to the third embodiment provides a solution by ensuring that the number of flags 1 attached after the variable-length packet 3a' is larger than the number of flags attached after the fixed-length packet. For example, two flags are inserted. Accordingly, the possibility of the demultiplexing apparatus B according to the third embodiment detecting the flag is increased in comparison with a case where one flag 1 is attached after the variable-length packet 3a'. Accordingly, the possibility of data being properly restored is also increased.

Thus, according to the third embodiment, by ensuring that a larger number of flags are attached after the variable-length packet than after the fixed-length packet, the possibility of the demultiplexing apparatus B detecting the flag of the variable-length packet is increased so that the variable-length packet is restored properly.

FOURTH EMBODIMENT

The fourth embodiment described below concerns a selection of a code for the header 2 that is resistant to an error.

A multiplexing apparatus A according to the fourth embodiment is characterized by a selection of bits for building identification information set in the header 2, wherein it is ensured that the number of combinations of bits set in the header 2 is minimized and that a Hamming distance between the combinations is maximized.

Figure 6:
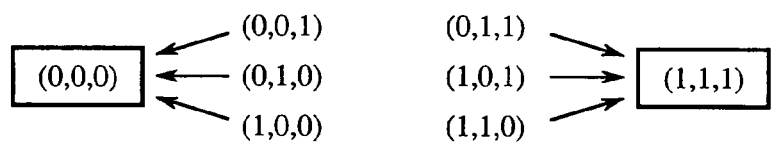
FIG. 6 shows bits forming a header in a multiplexed stream transmitted by a multiplexing apparatus A according to a fourth embodiment and received by a demultiplexing apparatus B according to the fourth embodiment.

FIG. 6 shows bits forming a header in a multiplexed stream transmitted by the multiplexing apparatus A according to the fourth embodiment and received by the demultiplexing apparatus B according to the fourth embodiment.

More specifically, FIG. 6 shows a case in which the header comprises three bits. In this case, the multiplexing apparatus A selects (0, 0, 0) and (1, 1, 1) as three bits constructing the header in order to discriminate between two types of headers. In this case, the Hamming distance is 3.

Accordingly, when one-bit error is introduced in the header, the demultiplexing apparatus B according to the fourth embodiment receiving that header is capable of determining that one of the two sets (0, 0, 0) and (1, 1, 1) nearer in distance is being received. FIG. 6 shows that (0, 0, 1), (0, 1, 0) or (1, 0, 0) occurring as a result of one-bit error in (0, 0, 0) warrants an estimation that the header is (0, 0, 0) and that (0, 1, 1), (1, 0, 1) or (1, 1, 0) occurring as a result of one-bit error in (1, 1, 1) warrants an estimation that the header is (1, 1, 1).

By ensuring that the Hamming distance is large between bits that are actually used in constructing an n-bit header, it is possible to identify the header appropriately even when an error is introduced in the header.

Thus, according to the fourth embodiment, it is ensured that the variety of header bit combinations is minimized and the Hamming distance between the combinations is large. Accordingly, accurate header estimation and data restoration is possible even when an error is introduced in the header 2 as identification information.

FIFTH EMBODIMENT

The fifth embodiment concerns a detailed procedure for data restoration in the demultiplexing apparatus B.

Figure 7:
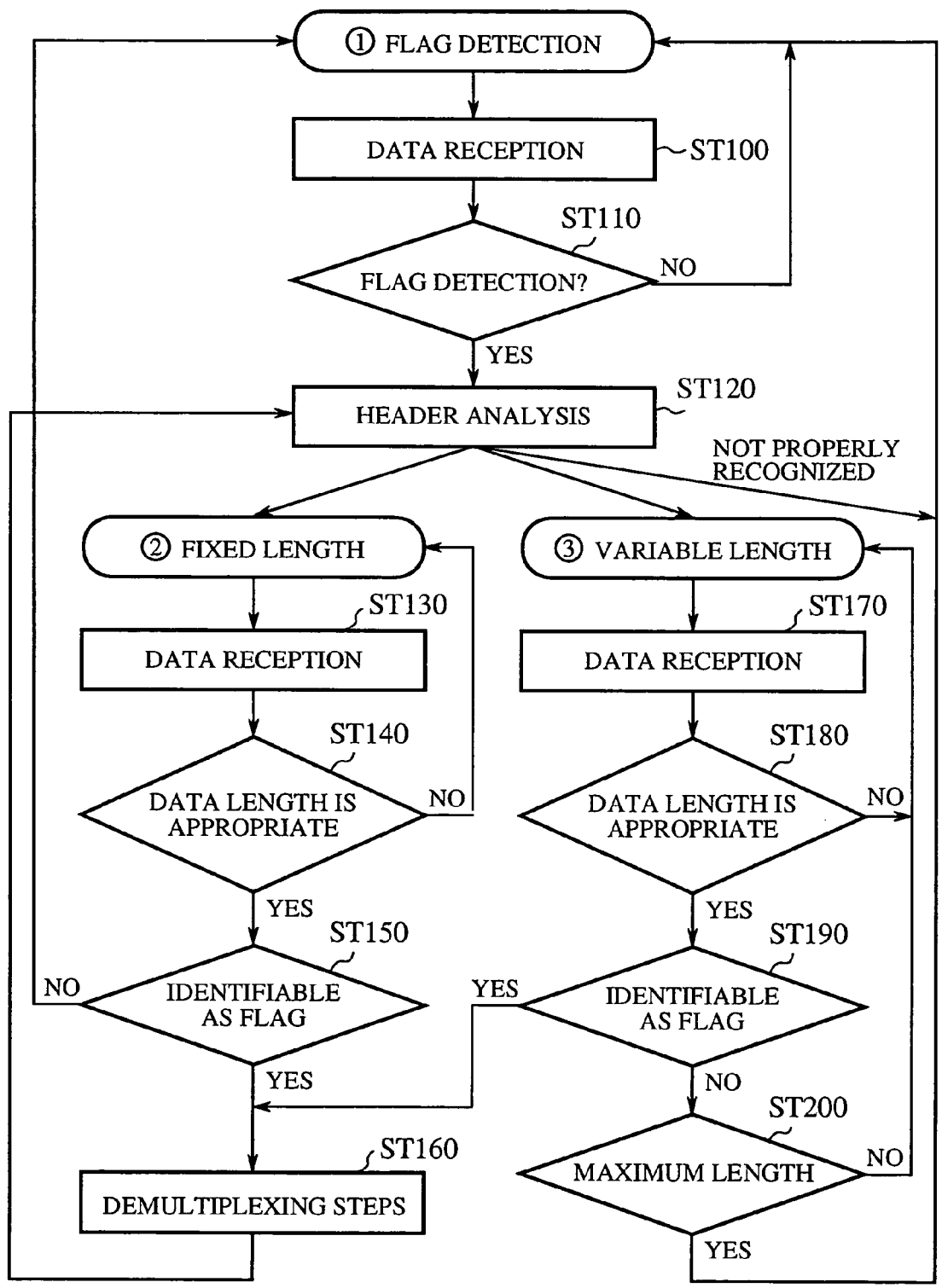
FIG. 7 shows a flow of a process for data restoration in a demultiplexing apparatus B according to a fifth embodiment.

FIG. 7 shows a flow of a process for data restoration in the demultiplexing apparatus B according to the fifth embodiment.

First, a flag detection process will be described.

When the demultiplexing apparatus B receives data in the multiplexed stream 5 (step ST100), a flag detection step is performed, i.e. it is determined whether the received data is the flag 1 (step ST110). If it is determined that the received data is not identified with the flag 1 ("NO" in step ST110), control is returned to step ST100 where next data is received. The flag detection step of FIG. 7 may proceed such that the expected position of the subsequent flag is identified by knowing the length of the packet or the range thereof using the header constructed according to any of the first through fourth embodiments. If it is determined that the received data is the flag 1 and the integrity of the flag is confirmed ("YES" in step ST110), a step for analyzing the header 2 is performed (step ST120), i.e. it is determined whether the data sequence subsequent to the header 2 is a fixed-length packet or a variable-length packet. This step is provided since subsequent steps depend on whether the subsequent data sequence is a fixed-length packet or a variable-length packet. If an unregistered header is identified in the header analysis step ST120, or if the header cannot be properly recognized, it is determined that the flag-detected in step ST110 is not a normal flag or the header analyzed in step ST120 is not a genuine header. Control is then returned to step ST100 where the flag detection is performed again.

A description will now be given of a step performed when it is determined that the subsequent data sequence is a fixed-length packet.

If it is determined that the subsequent data sequence is a fixed-length packet as a result of the header analysis, the demultiplexing apparatus B is capable of knowing the length of the fixed-length packet by analyzing the header, since the length of the fixed-length packet differs from data type to data type, i.e. from header to header. The demultiplexing apparatus B repeats a data reception step ST130 ("No" in step ST140->step ST130) until the fixed length recognized based on the header is reached ("YES" in step ST140).

After the fixed length is reached, the demultiplexing apparatus B performs a step similar to step ST110 for detecting the flag. A determination is then made as to whether the detected flag is normal (step ST150). When it is determined that the detected flag is not normal ("No" instep ST150), the demultiplexing apparatus B performs the data reception step ST100 and the flag detection step ST110.

When it is determined that the detected flag is normal ("YES" in step ST150), the demultiplexing apparatus B subjects the packet data received until the detection of the flag to demultiplexing (step ST160). Control is then returned to step ST120, where the header subsequent to the flag is analyzed, so that the subsequent steps are repeated.

A description will now be given of a process performed when it is determined that the subsequent data sequence is a variable-length packet in the header analysis step of step ST120.

When it is determined that the subsequent data is a variable-length packet as a result of the header analysis, the demultiplexing apparatus B is capable of recognizing the length of the variable-length packet or the range thereof, based on the header. The demultiplexing apparatus B repeats the data reception step ("No" in step ST180->step ST170) until the length determined by analyzing the header or the range thereof is reached (step ST180 "YES").

When the length or the range is reached while receiving the data ("YES" in step ST180), the demultiplexing apparatus B performs a step similar to step ST110 for detecting the flag. A determination is then made as to whether the detected flag is normal (step ST190). When it is determined that the detected flag is normal ("YES" in step ST190), the demultiplexing apparatus B subjects the packet data received until the detection of the flag to demultiplexing (step ST160). Control is then returned to the header analysis step ST120, so that the subsequent steps are repeated.

When it is determined that the detected flag is not normal ("No" in step ST190) and when the length of the variable-length packet is indicated by a range, a determination is made as to whether the length of the received data exceeds a maximum length in the range of variable length determined based on the header (step ST200). If the received length does not exceed the maximum length ("No" in step ST200), control is turned to the data reception step ST170 to continue to identify the flag. When the received length exceeds the maximum of variable length ("YES" in step ST200), the demultiplexing apparatus B performs the data reception step ST100 and the flag detection step ST110. If the header indicates the length of the variable-length packet directly, the determination step of ST200 is unnecessary.

Thus, according to the fifth embodiment, by combining the flag detection and header analysis capabilities according to the first through fourth embodiments, it is possible to restore data appropriate even when a pattern identical with the flag occurs in data.

In order to prevent the demultiplexing apparatus B from misidentifying the flag, the integrity of the flag may be recognized by examining both the flag and the header. For example, misidentification occurs when a code identical with the flag is included in data. Particularly, since the position of the flag occurring subsequent to the variable-length packet may be unpredictable, flag emulations may occur frequently in variable-length packets. By ensuring that only limited bit patterns are available for a header subsequent to the flag, it is determined that a flag emulation occurs when bits not matching any of the patterns follow what is initially identified as a flag. With this, flags are detected properly.

Accordingly, by combining the flag detection and header analysis capabilities, the fifth embodiment provides an advantage in that data are restored properly even when a pattern identical with the flag occurs in the data.

The demultiplexing apparatus B may be designed to provide tolerance for errors in flags and headers so that it does not fail to detect flags due to transmission errors. For example, the expected position of the flag for a packet may be identified based on the header for the previous packet so that, even when a pattern with one-bit error from the flag pattern is detected at the expected position, that pattern is properly identified as a flag, thereby providing an error-tolerant flag detection. While an error may be introduced not only in the flag but also in the header, the proper header may still be known by estimation so that data restoration is performed properly using the estimated header bits.

As described above, according to the fifth embodiment, by allowing the flag detection steps and header analysis steps to continue even when an accurate bit pattern is not detected, data are restored properly even when an error is introduced in the flag or the header.

SIXTH EMBODIMENT

A description will now be given of a sixth embodiment directed to a data restoration process performed when the header fails to be recognized properly.

In the following description, it is assumed, as in the first embodiment, that a transmission error or the like is introduced in the header multiplexed in the data transmitted by the multiplexing apparatus A.

Figure 8:
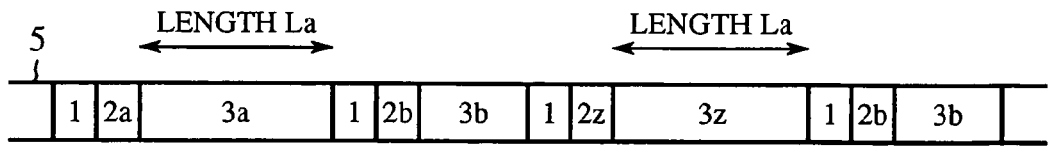
FIG. 8 shows an example of a multiplexed stream transmitted by a multiplexing apparatus A according to a sixth embodiment, having an error introduced therein, and received by a demultiplexing apparatus B according to the sixth embodiment.

FIG. 8 shows an example of a multiplexed stream transmitted by the multiplexing apparatus A according to the sixth embodiment, having an error introduced therein, and received by the demultiplexing apparatus B according to the sixth embodiment.

More specifically, referring to FIG. 8, the header 2a is turned into a header 2z of a value not permitted as a header due to a transmission error or the like. As a result, the data type of the packet 3a cannot be identified so that the packet 3a is recognized as a packet 3z the length of which is unknown.

It is possible, however, for the demultiplexing apparatus B according to the sixth embodiment to determine that the length of the packet 3z is La by detecting the flag 1 and the header 2b subsequent to the packet 3z. Consequently, the input data type is uniquely identified based on the packet length. Since a header associated with the length La must be the header 2a, the header 2z is identified as the header 2a with an error introduced therein. The packet 3z is processed as the packet 3a produced by packetizing the data a.

By establishing unique correspondence between the packet length and the data type, i.e. between the packet length and the header as identification information indicating the data type, data restoration is performed properly even when an error is introduced in the header, by detecting the flag subsequent to an header in error, calculating the length of the packet of an unknown data type, identifying the header based on the calculated packet length, and recognizing the data type indicated by the header.

The process described above may be employed in the flag detection process and the header analysis process described in the fifth embodiment. With this, data are restored properly even when a transmission error is introduced in the flag or the header.

The demultiplexing apparatus B according to the sixth embodiment may be configured such that, when the header cannot be identified based on the length by employing the above-described method, the data already retrieved by demultiplexing may be processed as data of a type that occurs relatively frequently.

For example, since video data is abundant in audio-visual communication, the likelihood of proper restoration is high by restoring data of an unknown data type as video data by demultiplexing. In other words, data in which the data type is unknown due to a failure to analyze the header are most properly restored as data that occurs frequently.

According to the sixth embodiment as described above, there is provided an advantage in that it is possible to increase the likelihood that data of an unknown data type is properly restored, by retrieving the unknown data as data of a type that occurs frequently.

In describing the embodiments 1-6 above, the individual features are highlighted such that the description of a particular embodiment is not introduced into the description of another embodiment. However, any combinations of embodiments are possible without creating contradiction between the embodiments. For example, the third embodiment, in which the number of flags provided after the variable-length packet is larger than that of flags provided after the fixed-length packet, may suitably be employed in combination with the second embodiment and the fourth through sixth embodiments. With this, it is not only possible to identify the length of a variable-length packet or a range thereof from the header 2 but also to ensure that the flags 1 are detected more efficiently since a relatively large number of them are provided after the variable-length packet. The fourth embodiment, in which the header 2 is encoded using codes that are resistant to an error, may suitably be employed in combination with the first through third embodiments, the fifth embodiment and the sixth embodiment. With this, accurate header estimation and data restoration is possible for a variable-length packet as well as for a fixed-length packet, even when an error is introduced in the header 2 as identification information. Other combination of embodiments are of course possible.

INDUSTRIAL APPLICABILITY

As described above, the multiplexing apparatus and the demultiplexing apparatus according to the invention are suitably used to receive multimedia data of a plurality of data types such as digitized video, audio and general-purpose data, packetize the input data, multiplexes the packets and transmit a resultant multiplexed stream, such that the multiplexed stream is properly demultiplexed even when a flag emulation or an error in a flag or a header occurs.

The invention claimed is:

1. A multiplexing apparatus, comprising:
a packetizer configured to packetize input data of a plurality of data types into fixed length packets each of which has a different packet length for each data type, and
a multiplexer configured to multiplex resultant packets for transmission, wherein
identification information indicating the data type is attached to each of the packets,
said multiplexing apparatus is configured to negotiate with a demultiplexing apparatus to determine the different fixed packet length, for each of the plurality of data types, into which the input data of each of the plurality of data types is to be split, prior to the transmission of the multiplexed resultant packets, and
the different fixed packet length, for each of the plurality of data types, is used by the demultiplexing apparatus to estimate a corresponding data type of one of the transmitted multiplexed resultant packets, when the demultiplexing apparatus cannot identify the corresponding data type based on the identification information attached to the one of the transmitted multiplexed resultant packets.

2. The multiplexing apparatus according to claim 1, wherein, said packetizer is also configured to packetize the input data into a plurality of variable-length packets and when the packetizing results in a plurality of variable length packets the identification information is attached to the variable-length packets to indicate that a maximum length is defined for the variable-length packets.

3. A multiplexing apparatus, comprising:
a packetizer configured to packetize input data of a plurality of data types, and
a multiplexer configured to multiplex resultant packets for transmission, wherein
identification information indicating the data type is attached to each of the packets,
a packet length differs from data type to data type,
when packetizing the input data into packets results in a plurality of variable-length packets instead of fixed-length packets, the identification information is attached to the variable-length packets to indicate that a maximum length is defined for the variable-length packets, and a number of flags indicating a separation between packets and provided after the variable-length packet multiplexed is larger than a number of flags provided after the fixed-length packet.

4. A multiplexing apparatus, comprising:
a packetizer configured to packetize input data of a plurality of data types, and
a multiplexer configured to multiplex resultant packets for transmission, wherein
identification information indicating the data type is attached to each of the packets,
a packet length differs from data type to data type,
a number of combinations of bits set in the identification information is minimized and a Hamming distance between the combinations is maximized,
said multiplexing apparatus is configured to negotiate with a demultiplexing apparatus to determine a different fixed packet length, for each of the plurality of data types, into which the input data of each of the plurality of data types is to be split, prior to the transmission of the multiplexed resultant packets, and
the different fixed packet length, for each of the plurality of data types, is used by the demultiplexing apparatus to estimate a corresponding data type of one of the transmitted multiplexed resultant packets, when the demultiplexing apparatus cannot identify the corresponding data type based on the identification information attached to the one of the transmitted multiplexed resultant packets.

5. A demultiplexing apparatus, comprising:
a receiver configured to receive a plurality of multiplexed input data packets with identification information attached to one of the plurality of multiplexed input data packets, the identification information corresponding to one of a plurality of data types corresponding to a length of the one of a plurality of multiplexed input data packets, wherein the multiplexed input data packets include fixed length packets each of which has a different packet length for each data type, and the fixed length packets are obtained by a multiplexing apparatus packetizing input data of the plurality of data types,
a processor configured to restore individual packets based on a flag indicating a separation between individual packets, and
an output device configured to output restored packets for each of the data types based on the identification information, wherein
said demultiplexing apparatus is configured to negotiate with the multiplexing apparatus to determine the different fixed packet length, for each of the plurality of data types, into which the input data of each of the plurality of data types is split, and
when the demultiplexing apparatus cannot identify a corresponding data type of one of the multiplexed input data packets based on the identification information attached to the one of the plurality of multiplexed input data packets, the corresponding data type is estimated based on a measured packet length of the one of the plurality of multiplexed input data packets and the negotiated different fixed packet length for each of the plurality of data types.

6. The demultiplexing apparatus according to claim 5, wherein said demultiplexing apparatus is configured to negotiate with the multiplexing apparatus to determine the packet length, into which the input data of each of the plurality of data types is split, prior to receiving the plurality of multiplexed input data packets.

7. A demultiplexing apparatus, comprising:
a receiver configured to receive multiplexed data packets, identification information indicating a data type being attached to each of the packets, and a length of each packet depending on a corresponding data type,
a processor configured to restore individual packets based on a flag indicating a separation between the packets, and
an output device configured to output restored packets for each of the data types based on the identification information, wherein
when an error is introduced in the identification information, a value closest to the information in error in Hamming distance is identified as the identification information, and
when the demultiplexing apparatus cannot identify a corresponding data type of one of the multiplexed data packets based on identification information attached to the one of the multiplexed data packets, the corresponding data type of the one of the multiplexed data packets is estimated based on a measured packet length of the one of the multiplexed data packets and a negotiated different fixed packet length for each of a plurality of data types.

8. The demultiplexing apparatus according to claim 7, wherein said demultiplexing apparatus is configured to negotiate with a multiplexing apparatus to determine the packet length of a plurality of data types, prior to receiving the multiplexed data packets.

* * * * *

UNITED STATES PATENT AND TRADEMARK OFFICE
CERTIFICATE OF CORRECTION

PATENT NO. : 7,630,411 B2 Page 1 of 1
APPLICATION NO. : 10/467342
DATED : December 8, 2009
INVENTOR(S) : Baba et al.

It is certified that error appears in the above-identified patent and that said Letters Patent is hereby corrected as shown below:

On the title page, Item (73), the Assignee's information is incorrect. Item (73) should read:

-- (73) Assignee: Mitsubishi Denki Kabushiki Kaisha,
Tokyo (JP) --

Signed and Sealed this

Second Day of February, 2010

David J. Kappos
*Director of the United States Patent and Trademark Office*